United States Patent [19]

Okuda et al.

[11] 4,376,262
[45] Mar. 8, 1983

[54] METHOD AND APPARATUS FOR CONTROLLING A DIGITAL CONTROLLED BRUSHLESS MOTOR

[75] Inventors: Masanao Okuda, Kosai; Wataru Oishi, Hamamatsu, both of Japan

[73] Assignee: Fuji Electrochemical Co., Ltd., Tokyo, Japan

[21] Appl. No.: 238,485

[22] Filed: Feb. 26, 1981

[30] Foreign Application Priority Data

Feb. 29, 1980 [JP] Japan .................................. 55-24709

[51] Int. Cl.$^3$ ............................................. H02K 29/04
[52] U.S. Cl. .................................... 318/696; 318/685; 318/138; 318/254
[58] Field of Search ............... 318/696, 685, 138, 254, 318/254 A

[56] References Cited

U.S. PATENT DOCUMENTS 3,411,058 11/1968 Madsen et al. ....................... 318/696
3,766,462 10/1973 Kubo et al. ........................... 318/696

FOREIGN PATENT DOCUMENTS 2345874 4/1974 Fed. Rep. of Germany ...... 318/696
55-153296 11/1980 Japan ................................... 318/696

Primary Examiner—J. V. Truhe
Assistant Examiner—S. M. Bergmann
Attorney, Agent, or Firm—Fleit, Jacobson & Cohn

[57] ABSTRACT

There are provided a method of and an apparatus for controlling a pulse controlled brushless motor to immediately pull-in the motor to a predetermined rotational speed. The method has the steps of encoding rotational condition of a rotor into an electric signal, detecting the encoded signal to determine whether the rotor is in rotation or not, synchronizing a signal of a pull-in pulse rate with a clock pulse when the rotor is not in rotation and synchronizing the encoded signal with the clock pulse when the rotor is in rotation to form an input pulse train. The input pulse train is supplied to a peripheral circuit to excite the motor.

8 Claims, 4 Drawing Figures

METHOD AND APPARATUS FOR CONTROLLING A DIGITAL CONTROLLED BRUSHLESS MOTOR

BACKGROUND OF THE INVENTION

The present invention relates to a method of and apparatus for controlling a pulse controlled, constant speed brushless motor actuated by a predetermined frequency with less speed-irregularity or cogging, the motor being used particularly for, though not limited to, direct-driving a capstan for a tape recorder, drum drive mechanism for facsimiles, and disc rotation mechanism for floppy disc drives. More particularly, the present invention relates to a method of and apparatus for accelerating immediately and automatically a rotation of the motor up to a predetermined rotational speed when the motor is started to rotate, or otherwise when the motor is decelerated by some reasons. In the present application, the term "pulse controlled brushless motor" intends to mean a motor which has a structure similar to that of a so-called a stepping motor and rotates continuously with a minimum speed irregularity in synchronization with continuous pulse signal inputs.

The pulse controlled brushless motor of the type described will not start to rotate even when the motor is supplied with a pulse train of a predetermined operational pulse rate which is higher than the maximum pull-in pulse rate correspondent to a load of the motor. An attempt has been made in which pulse trains are provided, at the beginning, with a pulse rate lower than the maximum pull-in pulse rate and progressively increasing the pulse rate to a final, desired pulse rate, when an input pulse rate correspondent to a motor speed is higher than the maximum pull-in pulse rate. Accordingly, the input pulse rate should be swept into the slewing pulse rate range by utilizing a variable frequency oscillator every time when the motor is to be started to rotate or when the motor is overloaded by some reasons.

SUMMARY OF THE INVENTION

An object of the present invention is to provide an improved method of and apparatus for controlling the pulse controlled brushless motor.

Another object of the present invention is to provide a new method of and apparatus for controlling the pulse controlled brushless motor, which permits to pull-in the motor immediately and automatically at the predetermined pulse rate which is higher than the maximum pull-in frequency.

A further object of the present invention is to provide a new method of and apparatus for controlling the pulse controlled brushless motor, which permits a rerotation of the motor immediately and automatically when the motor decelerates or stops by an overload or the like.

Another object of the present invention is to provide an apparatus for controlling the pulse controlled brushless motor, in which the apparatus can meet with an ecconomical requirement.

Briefly, an apparatus according to the present invention incorporates a rotary encoder associated with a motor of the type described, detector for receiving output of the rotary encoder and detecting a rotation of the motor, clock pulse generator, frequency divider for dividing a clock pulse of the clock pulse generator to a pull-in pulse rate, and a device for combining the output from the rotary encoder, an output of the detector and the output from the frequency divider to synchronize the combined signal with the clock pulse, thereby forming an input pulse train. The pulse train is supplied to an excitation mode generator.

In a method of controlling the motor, the encoder is associated with a motor of the type described to encode a rotational condition of the motor into an electric signal to detect the encoded electric signal. In case of no output from the encoder, a signal of pull-in pulse rate is synchronized with the clock pulse, while an encoded signal is synchronized with the clock pulse in case that an output is obtained from the encoder. The synchronized signal is supplied to a excitation mode generator. When rotational speed of the motor does not correspond to the frequency of the clock pulse rate, an input pulse train is formed corresponding to any one of the pull-in pulse and the encoded electric signal.

Other objects and features of the present invention will become apparent from the detailed description of preferred embodiments thereof, which will be made with reference to the accompanying drawings. It is to be understood that accompanying drawings and description are for the purpose of illustration only and do not limit the invention and that the invention will be defined by the appended claims.

DETAILED DESCRIPTION OF THE INVENTION

Figure 1:
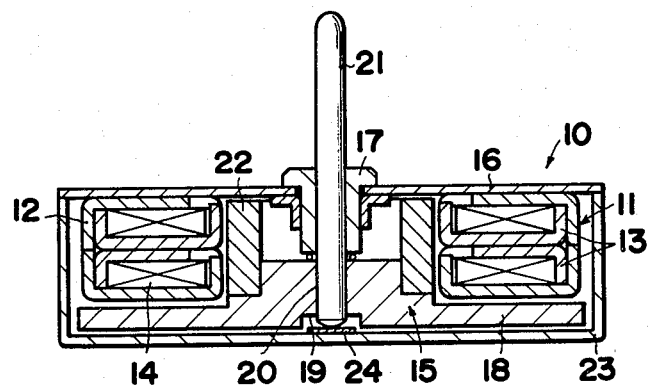
FIG. 1 is a sectional view of an exemplified pulse control brushless motor.

Referring first to FIG. 1, an exemplified structure of a pulse controlled brushless motor will be described hereinafter. A motor which is indicated in its entirety at 10 has a stator part 11 and rotor part 15. The stator part 11 has a structure similar to that of a known stepper motor which has a permanent magnet rotor, and is provided with outer yokes 12, inner yokes 13 and windings 14 interposed between the outer and inner yokes. The outer yokes 12 have a plurality of polar teeth extending towards their axes at constant interval from an inner circumference of the yokes. Similarly, the inner yokes 13 have a plurality of polar teeth. The winding 14 is disposed between the outer yoke and inner yoke. The outer yoke 12 and inner yoke 13 containing therebetween the winding 14 is connected together such that the teeth of the outer yoke 12 are staggered relative to the teeth of the inner yoke 13. The inner yokes 13 are in an opposed relation with each other, and the teeth of one inner yoke are staggered or skewed by one fourth (¼) of the angular degree of the teeth of the other inner yoke. The two pairs of the thus formed yoke structure are attached to a flange 16, the latter having a bearing 17 at the center thereof.

The rotor part 15 is provided with a flywheel 18 in an integral fashion. The flywheel 18 has a recess 19 at the central bottom thereof and a central hole communicated with the recess 19. A rotor shaft 21 is press-fitted into the hole 20 of the flywheel 18, in which the end of the rotor shaft 21 extends to a horizontal plane of the bottom of the flywheel. At the middle portion of the flywheel 18 is rigidly provided an annular permanent magnet 22 such as ferrite magnet which has an outer diameter substantially equal to the diameter of the middle portion. The annular permanent magnet 22 has multi-pole magnetization evenly spaced apart, the adjacent poles being of opposite direction, such that the number of poles of the rotor is equal to that of the stator. The flywheel 18 is designed to have a maximum outer diameter substantially equal to the outer diameter of the combined structure of the yokes 12 and 13. Namely, the outer end of the lower portion of the flywheel 18 is substantially aligned, in a vertical relation, with an outer circumferential surface of the stator part 11.

The rotor part 15 as described is snuggly inserted into the stator part 11 such that the rotor shaft 21 is rotatably supported within the bearing 17, and thereafter a casing 23 is fixed to the flange 16. The rotor shaft 21 is also supported at its end by a bearing 24 provided at a center of a casing 23. Thus the permanent magnet 22 is positioned in a symmetrical relation relative to the stator 11 or a dividing plane between the two inner yoke 13.

In a case that the motor is applied for driving a magnetic tape recorder in which a leakage flux from of the motor must be shielded so as not to affect a magnetic head, it is desired that the flange 16 as well as the casing 23 be made of magnetic materials.

The structure of the pulse controlled brushless motor is described in detail in a copending U.S. Application Ser. No. 198,235 filed Oct. 17, 1980 and West German Application No. P 30 39 255.3 filed Oct. 17, 1980, assigned to the common assignee of the present application. The thus structured motor can provide a smooth rotation of the rotor at a constant speed in accordance with the pulse train of the predetermined frequency.

Figure 2:
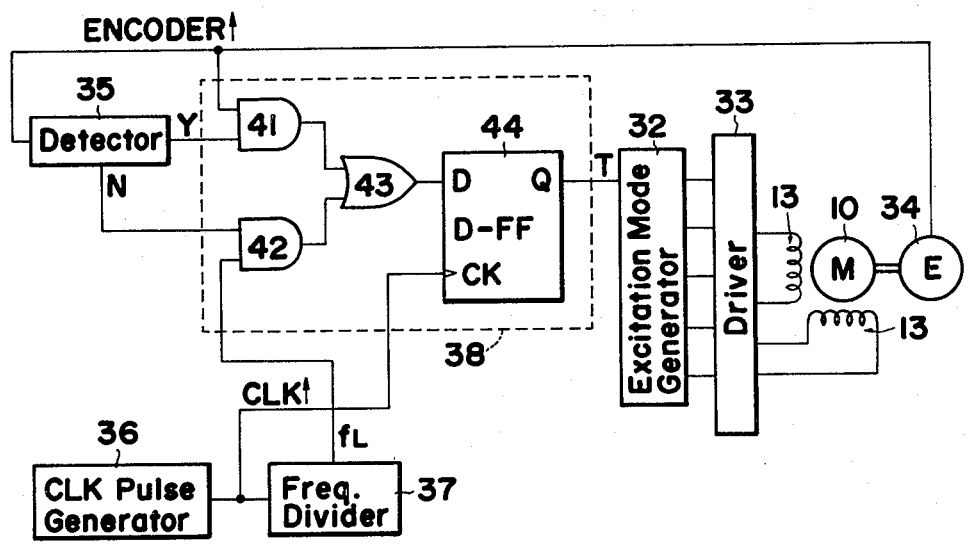
FIG. 2 is a block diagram of the inventive apparatus, also showing the inventive method.

In FIG. 2 which shows diagrammatically an electric circuit for operating the aforementioned motor, driving circuits of the motor 10 are similar to those of a known stepper motor. Namely, an excitation mode generator 32 consists of an electrical circuit which distributes input pulse trains to each phase of the motor in accordance with the number of phase and excitation mode, and a driving circuit 33 receives the distributed signals and supplies to the coils 13 of the motor electric current pulses necessary to excite the motor 10.

In accordance with the present invention, an apparatus for controlling the motor has a rotary encoder 34 which is designed to be associated with the motor 10, detector 35 for receiving an output from the rotary encoder 34 to detect whether or not the motor is in operation, clock pulse generator 36, and frequency divider 37 for dividing the clock pulse down to the level of a pull-in pulse rate.

The rotary encoder 34 has a function to convert the information of rotor position and speed into an electric signal, and may be of any conventional type, such as an optical encoder in which one or more light emission elements and photo sensors are disposed at opposing sides of a rotary code disc mounted on an output shaft of the motor, or a magnetic encoder which incorporates a magnetized or magnet-attached rotary disc mounted on the output shaft and magnetic sensor such as Hall element. In the simplest way of forming the rotary encoder, a Hall element is disposed in the vicinity of the rotor of the motor which is designed to have multi-pole magnetization evenly spaced.

The output of the rotary encoder 34 is fed to the detector 35 to detect whether the motor is in rotation (Y signal) or in a stopping state (N signal). The detection output from the detector 35, the output from the encoder 34 and a signal $f_L$ obtained by dividing the clock pulse from the oscillator 36 by means of the divider 37 are combined together, and then synchronized with the clock pulse to form an input pulse train T. The obtained input pulse train is fed to the excitation mode generator 32. The divider 37 can be replaced by an oscillator which can generate the signal $f_L$.

In a pulse train former circuit 38, a logical product of the encoder output and the aforementioned "Y" signal is obtained by a first AND circuit 41 while a logical product of the "N" signal and the divided signal is obtained by a second AND circuit 42, and outputs of those logical products are fed to an OR circuit 43. An output from the OR circuit 43 is fed to a terminal D of a D-type flip-flop 44 while the clock pulse from the generator 36 is fed to a clock terminal CK to produce an output Q, which is an input pulse train T. In other words, when the motor 10 is not in rotation, the "N" signal becomes of HIGH level and a divided signal of a pull-in pulse rate is fed through the AND circuit 42 and OR circuit 43 to the D-type flip-flop 44 and synchronized with the clock pulse CLK ↑ to produce the output Q. When the rotor starts to rotate, the "Y" signal becomes of HIGH level, and the encoder output is fed through the AND circuit 41 and OR circuit 43 to the D-type flip-flop 44 and synchronized with the clock pulse to form the aforementioned input pulse train T.

The input pulse train T is fed to the excitation mode generator 32 to drive the driving circuit 33. When rotational speed of the rotor 15 does not correspond to the frequency of the clock pulse, the motor 10 is driven by either the divided signal or a signal which has a frequency correspondent to the encoder output. Accordingly, the rotor can start to rotate and the predetermined constant rotational speed can be obtained even though the rotor is slow down in a condition of overload by some reasons.

Figure 3:
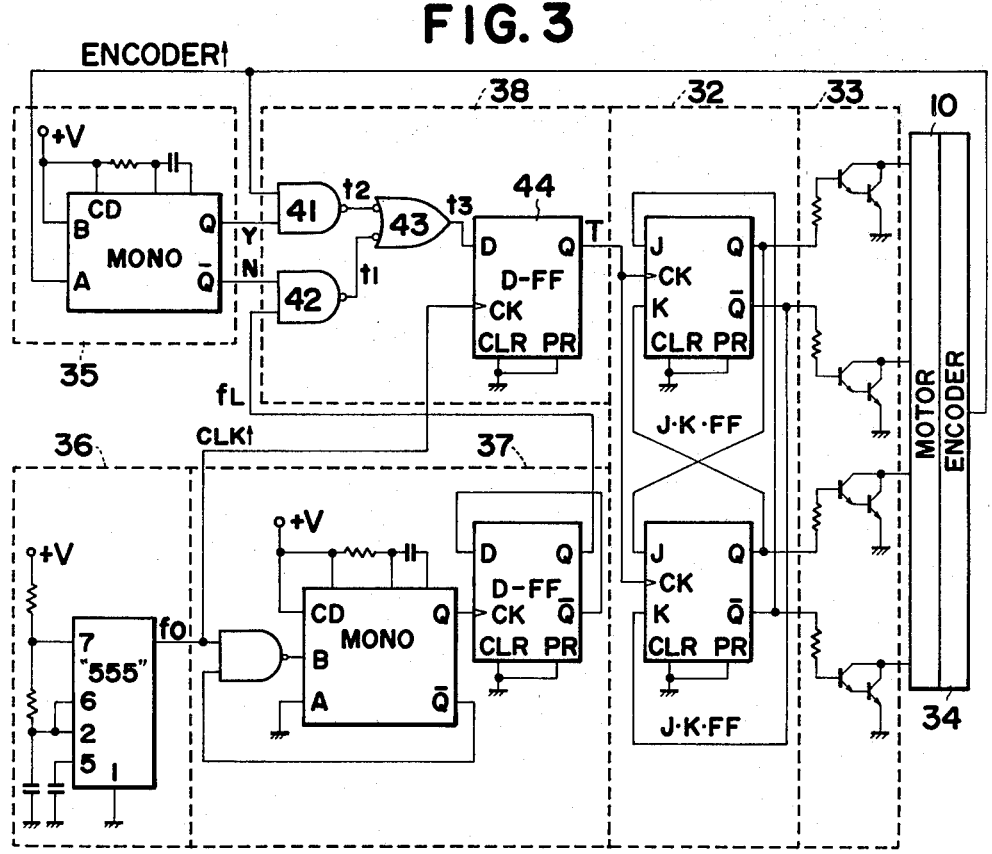
FIG. 3 is specific electric circuit structure of the apparatus shown in FIG. 2.
Figure 4:
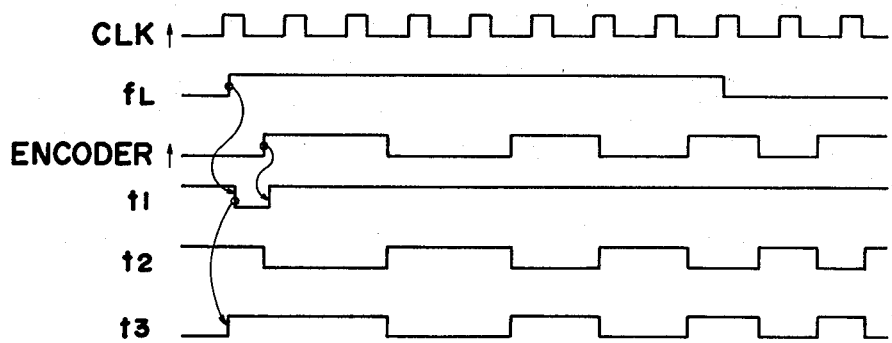
FIG. 4 is a timing chart of the circuitry elements shown in FIG. 3.

In FIGS. 3 and 4 in which the former shows more specific circuit construction, the encoder output detector 35 is formed with a retriggerable monostable multivibrator and utilizes, as the "Y" signal and "N" signal, the output Q and inverted signal Q of the output, respectively, the output Q being of HIGH level for a predetermined time after triggered. The clock pulse generator 36 is formed with a simple circuit having a known "555" timer IC, of which oscillating frequency can be adjusted to a necessary motor driving frequency by selecting values of C and R. If a high stability of frequency is required, a signal of a desired frequency can be obtained by utilizing a quartz crystal osillator and a frequency divider circuit. The frequency divider 37 is formed with a monostable multivibrator and a part of the D-type flip-flop 44. The monostable multivibrators of the detector 35 and of the frequency divider 37 can be formed with a single DIP (dual-in-line-package) IC, while the flip-flops of the pulse train former 38 and of the frequency divider 37 can be formed with another DIP IC, so as to minimize the number of ICs. The excitation mode generator 32 is formed with two J-K flip-flops.

An operational mode will be described with reference to FIGS. 3 and 4. When the motor is operated in the first place, the motor 10 is driven by the divided signal $f_L$ which is fed in such a manner as $f_L \rightarrow t1 \rightarrow t3 \rightarrow T$ (input pulse train) because an encoded signal does not exist. When the rotor is in an initial stage of rotation, the divided signal $f_L$ is inhibited and the encoder output ENCODER ↑ drives the motor, the encoder output being fed in such a manner as ENCODER ↑ →t2→t3→T, until a clock pulse CLK ↑ coincides in frequency with the encoder output ENCODER ↑. The ENCODER signal of FIG. 4 shows a relationship among the widths of successive pulses emanating from encoder 34 as the rotor speed increases. As shown, the width of the pulses decreases as rotor speed increases with time. When the ENCODER signal from the AND gate 41 is applied to the "D" input of flip-flop 44, the CLK signal applied to the CK input of the flip-flop 44 produces a driving pulse train T in such a manner so as to effect a smooth, continuous increase in the speed of the rotor until the encoder feedback signal synchronizes with the CLK signal. By this circuit arrangement, the invention avoids the rather abrupt changes in applied driving signal T which may cause correspondingly abrupt changes in the speed of a tape or disk device in which the invention might be used.

Though the present invention has been described with reference to the preferred embodiment, many modification and alterations can be made within the spirit of the invention.

What is claimed is:

1. Method of controlling a pulse controlled brushless motor which has an electric circuit means for producing a clock pulse in a slewing region and a signal of a pull-in pulse rate, and a peripheral circuit for exciting said motor, said motor being driven at a constant rotational speed in a region of slewing pulse rate, comprising the steps of:
   a. encoding a rotational condition of a rotor of the motor by means of a rotary encoder associated with the motor thereby to produce an encoded electric signal having a frequency proportional to the speed of the motor,
   b. detecting the encoded electric signal to determine whether said rotor is being rotated or not,
   c. synchronizing the signal of pull-in pulse rate with the clock pulse when said rotor is not being rotated, and synchronizing said encoded electric signal with said clock pulse when said rotor is being rotated, to thereby form an input pulse train, and
   d. supplying said input pulse train to said peripheral circuit, whereby when a rotational speed of said rotor does not correspond to a frequency of said clock pulse, said input pulse train is formed corresponding to any one of said signal of pull-in pulse rate and said encoded electric signal.

2. Apparatus for controlling a pulse controlled brushless motor having a rotor, comprising:
   a. a rotary encoder associated with said motor for producing an encoded output signal having a frequency proportional to a rotational speed of said rotor,
   b. detector means for receiving said encoded output signal of said rotary encoder and detecting a rotation of said rotor,
   c. a clock pulse generator for producing a clock pulse,
   d. a frequency divider for dividing said clock pulse thereby to produce a pull-in signal of a pull-in pulse rate,
   e. pulse train former means responsive to said detector means for alternatively combining with said clock pulse said encoder output signal or said pull-in signal to thereby form an input pulse train which, in the slewing range, generates an input pulse train that gradually effects increases in the motor speed until synchronized with said clock pulse, and in the pull-in range, generates an input pulse train having a frequency corresponding to said pull-in signal, and
   f. peripheral circuit means having an excitation mode generator for receiving said input pulse train and excitating said motor.

3. An apparatus for controlling a pulse controlled brushless motor having a rotor, comprising:
   a. a rotary encoder associated with said motor for producing an output having a frequency corresponding to a rotational speed of said rotor,
   b. detector means for receiving said output of said rotary encoder and detecting a rotation of said rotor, in which said detector means consists of a first monostable multivibrator triggered by the output of said rotary encoder,
   c. a clock pulse generator for producing a clock pulse,
   d. a frequency divider for dividing said clock pulse to a pull-in pulse rate,
   e. pulse train former means for combining an output of said rotary encoder, an output of said detector means and an output of said frequency divider to synchronize the combined signal with said clock pulse to thereby form an input pulse train, and
   f. peripheral circuit means having an excitation mode generator for receiving said input pulse train and excitating said motor.

4. An apparatus for controlling a pulse controlled brushless motor having a rotor, comprising:
   a. a rotary encoder associated with said motor for producing an output having a frequency corresponding to a rotational speed of said rotor,
   b. detector means for receiving said output of said rotary encoder and detecting a rotation of said rotor,
   c. a clock pulse generator for producing a clock pulse,
   d. a frequency divider for dividing said clock pulse to a pull-in pulse rate,
   e. pulse train former means for combining an output of said rotary encoder, an output of said detector means and an output of said frequency divider to synchronize the combined signal with said clock pulse to thereby form an input pulse train, in which said pulse train former means has a first AND gate, second AND gate, OR gate connected at its input terminals to said first AND gate and said second AND gate, and first D-type flip-flop circuit connected at its D terminal to an output terminal of said OR gate, said flip-flop circuit being clocked by the clock pulse, and
   f. peripheral circuit means having an excitation mode generator for receiving said input pulse train and excitating said motor.

5. An apparatus for controlling a pulse controlled brushless motor having a rotor, comprising:
   a. a rotary encoder associated with said motor for producing an output having a frequency corresponding to a rotational speed of said rotor,
   b. detector means for receiving said output of said rotary encoder and detecting a rotation of said rotor,
   c. a clock pulse generator for producing a clock pulse, d. a frequency divider for dividing said clock pulse to a pull-in pulse rate, e. pulse train former means for combining an output of said rotary encoder, an output of said detector means and an output of said frequency divider to synchronize the combined signal with said clock pulse to thereby form an input pulse train, in which said frequency divider has a second monostable multivibrator and a second D-type flip-flop circuit, said second D-type flip-flop circuit having a D terminal connected to an inverted Q terminal, thereby performing a toggle operation, an output terminal of said second monostable multivibrator being connected to a CK terminal of said second D-type flip-flop circuit, and f. peripheral circuit means having an excitation mode generator for receiving said input pulse train and excitating said motor.

6. An apparatus for controlling a pulse controlled brushless motor having a rotor, comprising:

a. a rotary encoder associated with said motor for producing an output having a frequency corresponding to a rotational speed of said rotor, b. detector means for receiving said output of said rotary encoder and detecting a rotation of said rotor, c. a clock pulse generator for producing a clock pulse, d. a frequency divider for dividing said clock pulse to a pull-in pulse rate, e. pulse train former means for combining an output of said rotary encoder, an output of said detector means and an output of said frequency divider to synchronize the combined signal with said clock pulse to thereby form an input pulse train, and f. peripheral circuit means having an excitation mode generator for receiving said input pulse train and excitating said motor in which said excitation mode generator has a first J-K flip-flop and a second J-K flip-flop, a CK input terminals of the first and second flip-flop being connected to said pulse train former means so that said input pulse train is fed to said CK input terminals, a J input terminal and a K input terminal of said first flip-flop being connected to an inverted Q output terminal and a Q outpute terminal, respectively, of said second flip-flop, a J input terminal and a K input terminal of said second flip-flop being connected to a Q output terminal and an inverted Q output terminal, respectively, of said first flip-flop.

7. An apparatus for controlling a pulse controlled brushless motor having a rotor, comprising:

a. a rotary encoder associated with said motor for producing an output having a frequency corresponding to a rotational speed of said rotor, b. detector means for receiving said output of said rotary encoder and detecting a rotation of said rotor, c. a clock pulse generator for producing a clock pulse, d. a frequency divider for dividing said clock pulse to a pull-in pulse rate in which said frequency divider produces an output having a frequency lower than a maximum pull-in pulse rate of the motor, e. pulse train former means for combining an output of said rotary encoder, an output of said detector means and an output of said frequency divider to synchronize the combined signal with said clock pulse to thereby form an input pulse train, and f. peripheral circuit means having an excitation mode generator for receiving said input pulse train and excitating said motor.

8. Apparatus for controlling a pulse controlled brushless motor having a rotor, comprising:

a. a rotary encoder associated with said motor for producing an encoded output signal proportional to the rotational speed of the motor, b. detector means for receiving said encoded output signal of said rotary encoder and detecting a rotational condition of said rotor, c. a first pulse generator for producing a clock pulse, d. a second pulse generator for producing a pull-in output signal having a frequency lower than a maximum pull-in pulse rate of the motor, e. pulse train former means responsive to said detector means for alternatively combining with said clock pulse said encoded output signal or said pull-in signal to thereby form an input pulse train which, in the slewing range, generates an input pulse train that gradually effects increases in the motor speed until synchronized with said clock pulse, and in the pull-in range, generates an input pulse train having a frequency corresponding to said pull-in signal, and f. peripheral circuit means having an excitation mode generator for receiving the input pulse train and exciting said motor.

* * * * *

UNITED STATES PATENT AND TRADEMARK OFFICE
CERTIFICATE OF CORRECTION

PATENT NO. : 4,376,262
DATED : Mar. 8, 1983
INVENTOR(S) : Masanao OKUDA et al

It is certified that error appears in the above-identified patent and that said Letters Patent are hereby corrected as shown below:

In the title, page 1, change:

"DIGITAL"    to    --PULSE--

Signed and Sealed this

Nineteenth Day of July 1983

[SEAL]

Attest:

Attesting Officer

GERALD J. MOSSINGHOFF

Commissioner of Patents and Trademarks